United States Patent
Yoshida et al.

(10) Patent No.: US 9,735,982 B2
(45) Date of Patent: Aug. 15, 2017

(54) SWITCH APPARATUS, VLAN SETTING MANAGEMENT METHOD, AND PROGRAM

(71) Applicant: NEC CORPORATION, Tokyo (JP)

(72) Inventors: Hirokazu Yoshida, Tokyo (JP); Yoji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/405,639

(22) PCT Filed: Jun. 5, 2013

(86) PCT No.: PCT/JP2013/065568
§ 371 (c)(1),
(2) Date: Dec. 4, 2014

(87) PCT Pub. No.: WO2013/183664
PCT Pub. Date: Dec. 12, 2013

(65) Prior Publication Data
US 2015/0172077 A1    Jun. 18, 2015

(30) Foreign Application Priority Data
Jun. 6, 2012   (JP) ................................ 2012-129231

(51) Int. Cl.
*H04L 12/46* (2006.01)
*H04L 12/947* (2013.01)
*H04L 12/24* (2006.01)

(52) U.S. Cl.
CPC ...... *H04L 12/4675* (2013.01); *H04L 12/4641* (2013.01); *H04L 41/085* (2013.01); *H04L 49/25* (2013.01)

(58) Field of Classification Search
CPC ... H04L 49/25; H04L 41/085; H04L 12/4641; H04L 12/4675
See application file for complete search history.

(56) References Cited

U.S. PATENT DOCUMENTS 6,775,290 B1 *  8/2004  Merchant ............ H04L 12/4645
370/395.31
7,639,689 B2   12/2009  Keller-Tuberg
(Continued)

FOREIGN PATENT DOCUMENTS

EP       2 239 892 A1    10/2010
JP    2009-239835 A      10/2009
(Continued)

OTHER PUBLICATIONS

"OpenFlow Switch Specification", Dec. 5, 2011 (Dec. 5, 2011), XP055177510, Retrieved from the Internet: URL: https://www.opennetworking.org/images/stories/downloads/sdn-resources/onf-specifications/openflow/openflow-spec-v1.2.pdf.
(Continued)

*Primary Examiner* — Gbemileke J Onamuti
(74) *Attorney, Agent, or Firm* — McGinn IP Law Group, PLLC

(57) ABSTRACT

A switch apparatus includes: a plurality of ports; a VLAN setting management unit storing entries, in each of which VLAN information and at least one of the plurality of ports are associated with each other, and adding or updating, if an entry corresponding to a combination of VLAN information included in a packet received from a port and the reception port of the packet is not stored, a corresponding entry for the received packet; and a functional unit notifying a predetermined control apparatus of an added or updated content of the entry.

24 Claims, 9 Drawing Sheets

(56) References Cited

U.S. PATENT DOCUMENTS

| | | | |
|---|---|---|---|
| 8,798,059 B1* | 8/2014 | Kommula | H04L 12/4641 370/389 |
| 2003/0026246 A1* | 2/2003 | Huang | H04L 45/00 370/352 |
| 2004/0210623 A1 | 10/2004 | Hydrie et al. | |
| 2005/0286537 A1 | 12/2005 | Shimada | |
| 2006/0227777 A1* | 10/2006 | Shimizu | H04L 12/4641 370/389 |
| 2007/0097972 A1 | 5/2007 | Jain et al. | |
| 2008/0189769 A1 | 8/2008 | Casado et al. | |
| 2011/0058560 A1 | 3/2011 | Okita et al. | |
| 2011/0188373 A1 | 8/2011 | Saito | |
| 2013/0003745 A1 | 1/2013 | Nishimura | |

FOREIGN PATENT DOCUMENTS

| | | |
|---|---|---|
| JP | 2011-061401 A | 3/2011 |
| JP | 2011-170718 A | 9/2011 |
| RU | 2310993 C2 | 11/2007 |
| RU | 2 382 398 C2 | 2/2010 |
| WO | WO 2008/095010 A1 | 8/2008 |
| WO | WO 2011/118585 A1 | 9/2011 |

OTHER PUBLICATIONS

Yasuhiro Yamasaki, et al.: "Flexible Access 1-5 Management System for Campus VLAN Based on OpenFlow", Applications and the Internet (SAINT), 2011 IEEE/IPSJ 11$^{th}$ International Symposium on, IEEE, Jul. 18, 2011 (Jul. 18, 201), pp. 347-351, XP032047183, DOI: 10.1109/SAINT.2011.66. ISBN: 978-1-4577-0531-1.

International Search Report (ISR) (PCT Form PCT/ISA/210), in PCT/JP2013/065568, dated Jul. 23, 2013.

Nick McKeown, et al., "OpenFlow: Enabling Innovation in Campus Networks", [online], [searched on May 31, 2012], Internet <URL:http://www.openflow.org/documents/openflow-wp-latest.pdf>.

"OpenFlow Switch Specification" Version 1.1.0 Implemented (Wire Protocol 0x02), [online], [searched on May 31, 2012], Internet <URL:http://www.openflow.org/documents/openflow-spec-v1.1.0.pdf>.

OpenFlow Switch Specification, Version 1.0.0 (Wire Protocol 0x01), Dec. 31, 2009 Sections 1-2, 3.3-3.4, 4.1 and 5.3.3.

Russian Notification on Results of Estimation of Patentability of Invention dated Feb. 8, 2016 with an English Translation thereof.

* cited by examiner

FIG. 3

| VLAN ID | PORT |
|---|---|
| 10 | 0/1, 0/2 |
| 20 | 0/3 |

SWITCH APPARATUS, VLAN SETTING MANAGEMENT METHOD, AND PROGRAM

REFERENCE TO RELATED APPLICATION

The present invention is based upon and claims the benefit of the priority of Japanese patent application No. 2012-129231, filed on Jun. 6, 2012, the disclosure of which is incorporated herein in its entirety by reference thereto.

TECHNICAL FIELD

The present invention relates to switch apparatuses, a VLAN (Virtual Local Area Network) setting management method, and a program. In particular, it relates to switch apparatuses controlled by a control apparatus in a centralized manner, a VLAN setting management method, and a program.

BACKGROUND

In recent years, a technique referred to as OpenFlow has been proposed (see PTLs 1 and 2 and NPLs 1 and 2). OpenFlow recognizes communications as end-to-end flows and performs path control, failure recovery, load balancing, and optimization on a per-flow basis. Each OpenFlow switch according to NPL 2 has a secure channel for communication with an OpenFlow controller and operates according to a flow table suitably added or rewritten by the OpenFlow controller. In the flow table, a set of the following three is defined for each flow: matching conditions (Match Fields) against which a packet header is matched; flow statistical information (Counters); and Instructions that define a processing content(s) (see section 4.1 "Flow Table" n NPL 2).

For example, when an OpenFlow switch receives a packet, the OpenFlow switch searches the flow table for an entry having a matching rule (see section 4.3 "Match Fields" in NPL 2) that matches header information of the received packet. If, as a result of the search, the OpenFlow switch finds an entry matching the received packet, the OpenFlow switch updates the flow statistical information (Counters) and processes the received packet on the basis of a processing content(s) (packet transmission from a specified port, flooding, dropping, etc.) written in the Instructions field of the entry. If, as a result of the search, the OpenFlow switch does not find an entry matching the received packet, the OpenFlow switch transmits an entry setting request to the OpenFlow controller via the secure channel. Namely, the OpenFlow switch requests the OpenFlow controller to determine a processing content for the received packet (Packet-In message). The OpenFlow switch receives a flow entry defining a processing content(s) and updates the flow table. In this way, by using an entry stored in the flow table as a processing rule (packet processing instruction), the OpenFlow switch performs packet forwarding.

Patent Literature (PTL)

PTL 1: International Publication No. WO2008/095010A1
PTL 2: Japanese Patent Kokai Publication No. 2011-170718A

Non Patent Literature (NPL)

NPL 1: Nick McKeown, and seven others, "OpenFlow: Enabling Innovation in Campus Networks", [online], [searched on May 31, 2012], Internet <URL:http://www.openflow.org/documents/openflow-wp-latestpdf>
NPL 2: "OpenFlow Switch Specification" Version 1.1.0 Implemented (Wire Protocol 0x02), [online], [searched on May 31, 2012], Internet <URL:http://www.openflow.org/documents/openfiow-spec-v1.1.0.pdf>

SUMMARY

The following analysis has been given by the present inventors. To allocate a VLAN to a port of a switch apparatus as typified by the above OpenFlow switch, a VLAN ID needs to be created manually via a command line interface (CLI) and allocated to an interface, counted as a problem.

By using a mechanism or the like for causing an OpenFlow switch to transmit a Packet-In message to an OpenFlow controller (control apparatus), the control apparatus can manage allocation of a VLAN to each switch apparatus. However, in such case, various problems may be caused, such as increase in the load on the control apparatus and stagnation in processing when the control apparatus malfunctions.

It is an object of the present invention to provide a switch apparatus, a VLAN setting management method, and a program for achieving appropriate management of a correspondence relationship between a VLANID(s) and a port(s), without requiring manual setting or central management by a control apparatus.

According to a first aspect, there is provided a switch apparatus, including: a plurality of ports; a VLAN setting management unit storing entries, in each of which VLAN information and at least one of the plurality of ports are associated with each other, and adding or updating, if an entry corresponding to a combination of VLAN information included in a packet received from a port and the reception port of the packet is not stored, a corresponding entry for the received packet; and a functional unit notifying a predetermined control apparatus of an added or updated content of the entry. Namely, this switch apparatus has a function of learning a VLAN setting for each port.

According to a second aspect, there is provided a VLAN setting management method, including: causing a switch apparatus, which includes a plurality of ports and stores entries, in each of which VLAN information and at least one of the plurality of ports are associated with each other, to determine whether an entry corresponding to a combination of VLAN information included in a packet received from a port and the reception port of the packet is stored; causing the switch apparatus to add or update, if a VLAN setting management unit does not store the combination of VLAN information included in the packet received from the port and the reception port of the packet, a corresponding entry for the received packet; and causing the switch apparatus to notify a predetermined control apparatus of an added or updated content of the entry. This method is associated with a certain machine, namely, with the switch apparatus processing packets to which VLAN information is added.

According to a third aspect, there is provided a program, causing a computer constituting a switch apparatus which includes a plurality of ports and stores entries, in each of which VLAN information and at least one of the plurality of ports are associated with each other, to perform processing for: determining whether an entry corresponding to a combination of VLAN information included in a packet received from a port and the reception port of the packet is stored; adding or updating, if a VLAN setting management unit does not store the combination of VLAN information included in the packet received from the port and the reception port of the packet, a corresponding entry for the received packet; and notifying a predetermined control apparatus of an added or updated content of the entry. This program can be recorded in a computer-readable (non-transient) storage medium. Namely, the present invention can be embodied as a computer program product.

The meritorious effects of the present invention are summarized as follows.

The present disclosure enables each switch apparatus to appropriately manage a correspondence relationship between a VLANID(s) and a port(s), without requiring manual setting or central management by a control apparatus.

BRIEF DESCRIPTION OF DRAWINGS

FIG. 3 illustrates a table stored in a VLAN setting management unit in the switch apparatus according to the first exemplary embodiment of the present disclosure.

DESCRIPTION OF EMBODIMENTS

Figure 1:
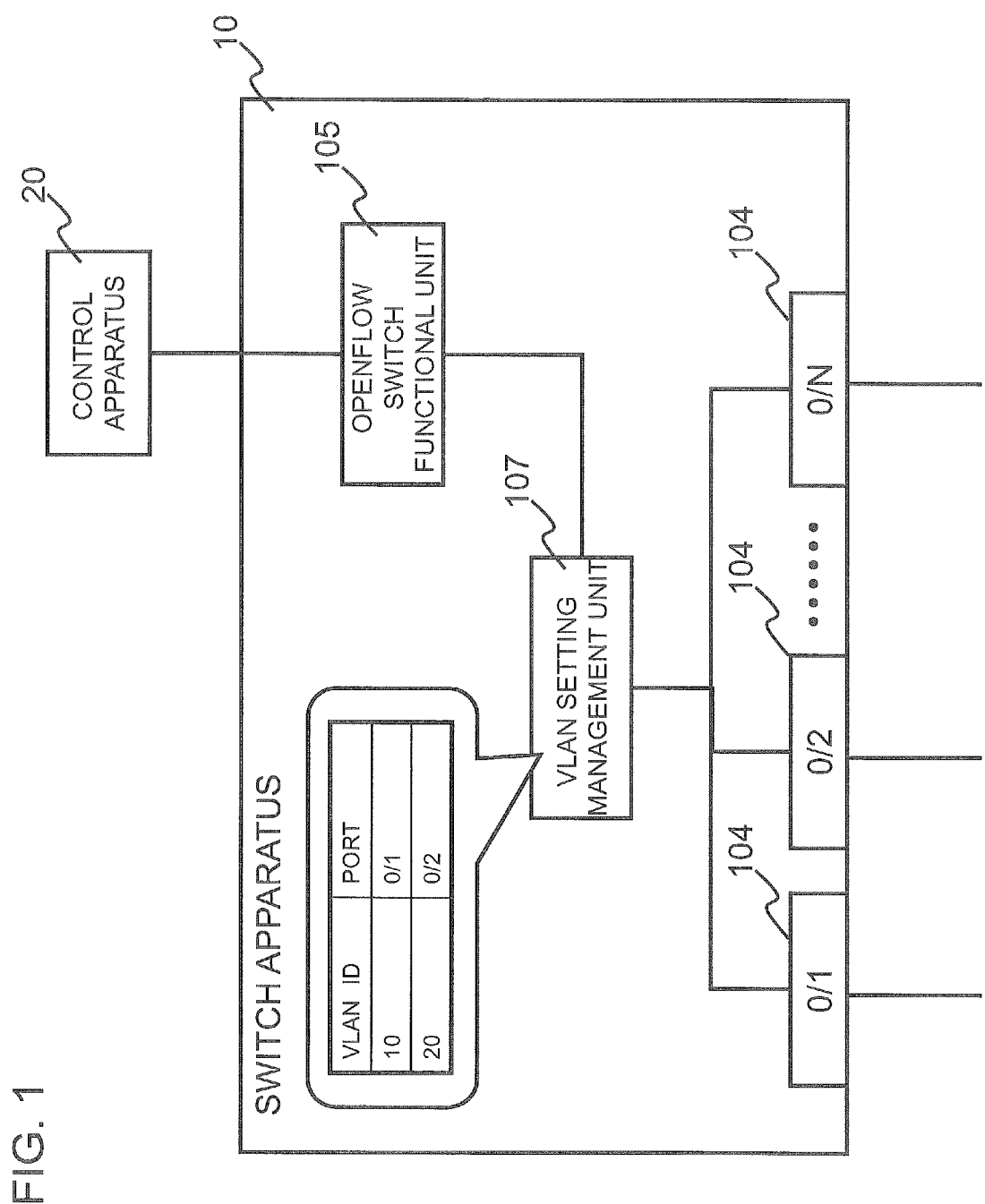
FIG. 1 illustrates a configuration according to an exemplary embodiment of the present disclosure.

First, an outline of an exemplary embodiment of the present disclosure will be described with reference to the drawings. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by a switch apparatus 10 controlled by a control apparatus 20. This switch apparatus 10 includes a plurality of (N) ports 104 and a VLAN setting management unit 107 storing entries, in each of which a VLAN ID and at least one of the plurality of ports 104 are associated with each other. When receiving a packet, the VLAN setting management unit 107 determines whether a combination of a VLAN ID added to the packet and a port that has received the packet exists in the entries stored in the VLAN setting management unit 107. As a result of the determination, if no entry corresponding to the combination of the VLAN ID and the reception port is stored in the VLAN setting management unit 107, the VLAN setting management unit 107 adds or updates a corresponding entry for the received packet. In addition, a functional unit (an OpenFlow switch functional unit 105) in the switch apparatus 10 notifies the control apparatus 20 of the added or updated content of the entry.

By using the switch apparatus 10 as described above, a correspondence relationship between a VLAN ID(s) and an interface(s) can be appropriately managed without requiring manual setting or central management by the control apparatus.

First Exemplary Embodiment

Figure 2:
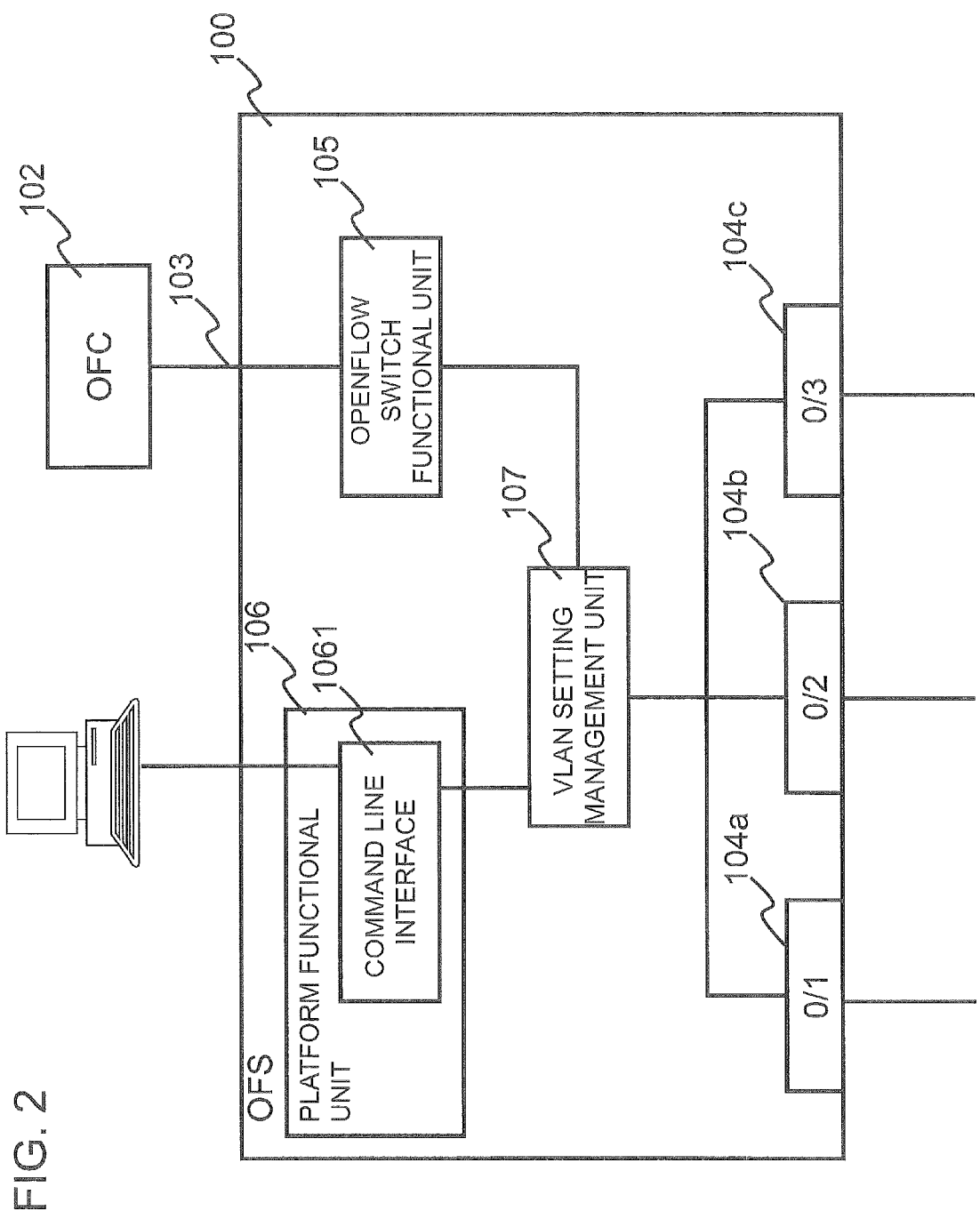
FIG. 2 illustrates a configuration of a switch apparatus according to a first exemplary embodiment of the present disclosure.

Next, a first exemplary embodiment of the present disclosure will be described in detail with reference to the drawings. FIG. 2 illustrates a configuration of a switch apparatus according to the first exemplary embodiment of the present disclosure. As illustrated in FIG. 2, an OpenFlow switch (OFS) 100 connected to an OpenFlow controller (OFC) 102 is arranged. In FIG. 2, the OFS 100 and the OFC 102 are connected to each other via a secure channel 103.

In FIG. 2, the OFS 100 includes three ports 104*a* to 104*c*, an OpenFlow switch functional unit 105 performing packet processing equivalent to that of an OpenFlow switch in NPLs 1 and 2, a platform functional unit 106 including a command line interface (CLI) 1061, and a VLAN setting management unit 107.

Each of the ports 104*a* to 104*c* is connected to another OFS or a host apparatus, and packets that the OFS 100 exchanges with these apparatuses are inputted and outputted via these ports 104*a* to 104*c*. Reference characters "0/1", "0/2, and "0/3" illustrated in FIG. 2 represent slot numbers and port numbers. For example, the port 104*a* can be represented by (0/1) signifying that the slot number is 0 and the port number is 1.

The OpenFlow switch functional unit 105 exchanges messages with the OFC 102 and performs packet processing equivalent to that of an OpenFlow switch in NPLs 1 and 2. More specifically, the OpenFlow switch functional unit 105 refers to a flow table stored therein and processes packets forwarded form the VLAN setting management unit 107. In addition, for example, the OpenFlow switch functional unit 105 adds, updates, or deletes entries in the flow table in accordance with control messages from the OFC 102.

The platform functional unit 106 is used when a table is updated in the VLAN setting management unit 107 via the CLI 1061.

Figure 3:
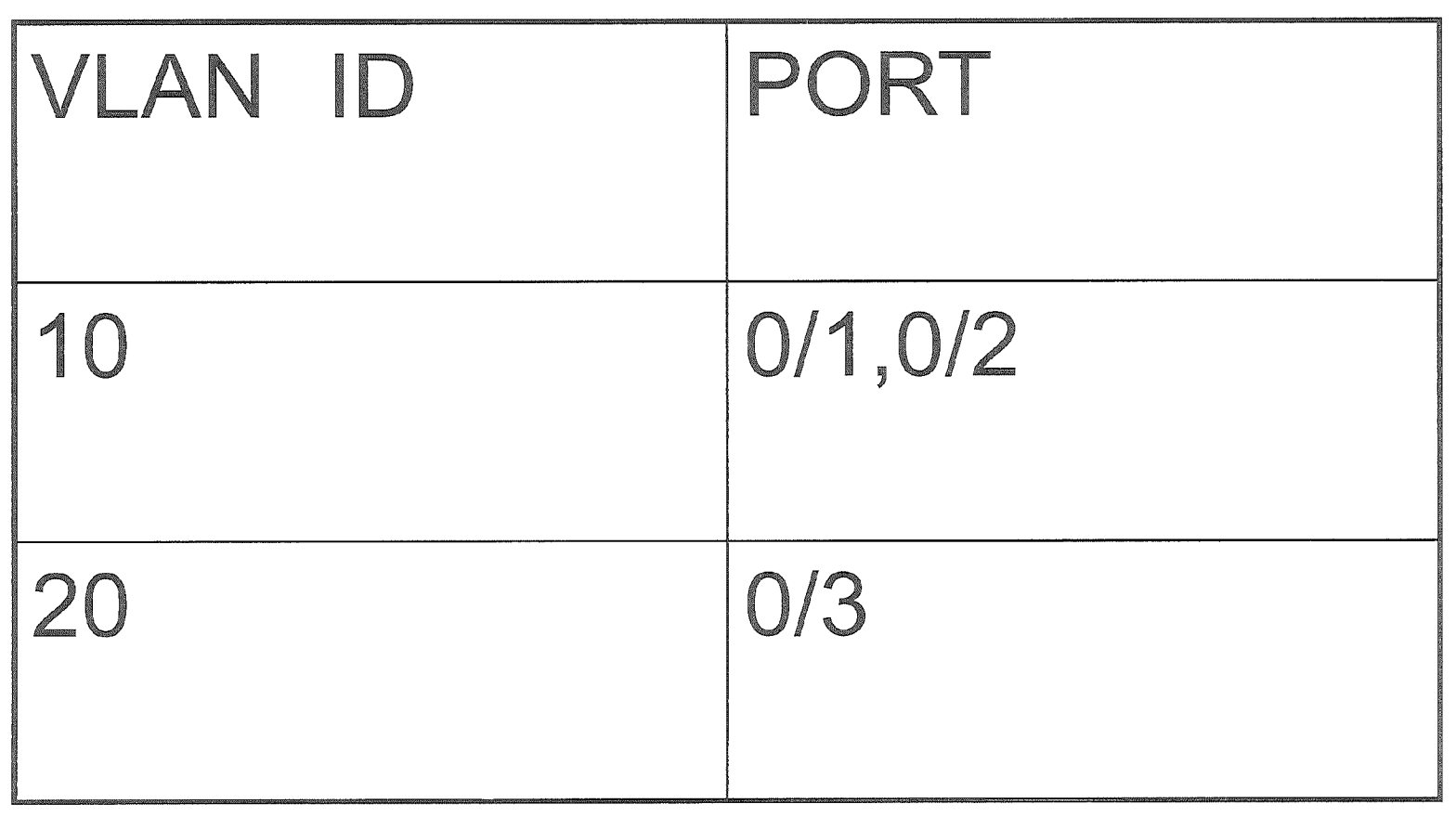

The VLAN setting management unit 107 is a functional unit managing a correspondence relationship between a VLAN ID(s) and a port(s). FIG. 3 illustrates a table used by the VLAN setting management unit 107 for managing a correspondence relationship between a VLAN ID(s) and a port(s). In FIG. 3, the port 104*a* (0/1) and the port 104*b* (0/2) in FIG. 2 are allocated to VLAN ID=10, and the port 104*c* (0/3) in FIG. 2 is allocated to VLAN ID=20. Such a correspondence relationship between a VLAN ID and a port in FIG. 3 may be inputted by an operator via the CLI 1061 in the platform functional unit 106 or may automatically be set by the procedure described below.

Each unit (processing means) of the switch apparatus and the OFS illustrated in FIGS. 1 and 2 can be realized by a computer program which causes a computer constituting a corresponding one of these apparatuses to use hardware thereof and execute each of the above processing.

Figure 4:
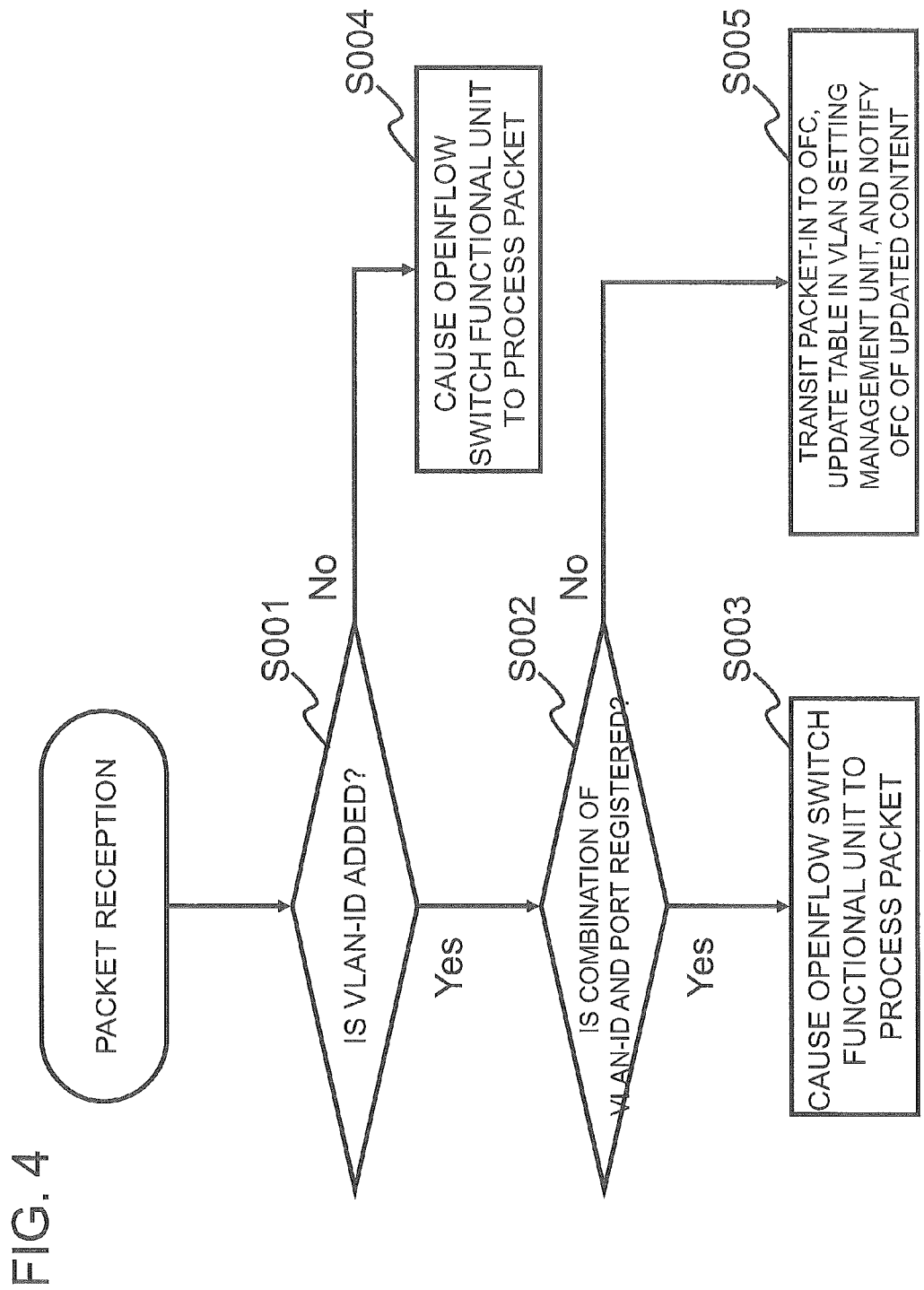
FIG. 4 is a flow chart illustrating an operation of the switch apparatus according to the first exemplary embodiment of the present disclosure.

Next, an operation of the present exemplary embodiment will be described in detail with reference to the drawings. FIG. 4 is a flow chart illustrating an operation performed by the OFS 100 according to the present exemplary embodiment. The OFS 100 performs this operation when receiving a packet. As illustrated in FIG. 4, first, the OFS 100 causes the VLAN setting management unit 107 to determine whether a VLAN ID is set in the header of the received packet (step S001). If no VLAN ID is set in the header of the received packet (No in step S001), the received packet is forwarded to the OpenFlow switch functional unit 105. The OpenFlow switch functional unit 105 processes the received packet in accordance with the flow table (step S004).

In contrast, if a VLAN ID is set in the header of the received packet (Yes in step S001), the OFS 100 determines whether the combination of the VLAN ID of the received packet and the reception port is registered in the table in the VLAN setting management unit 107 (step S002). If the combination of the VLAN ID of the received packet and the reception port is registered in the table in the VLAN setting management unit 107 (Yes in step S002), the received packet is forwarded to the OpenFlow switch functional unit 105. The OpenFlow switch functional unit 105 processes the received packet in accordance with the flow table (step S003).

In contrast, if the combination of the VLAN ID of the received packet and the reception port is not registered in the table in the VLAN setting management unit 107 (No in step S002), first, the OpenFlow switch functional unit 105 in the OFS 100 transmits a message (Packet-In message) to the OFC 102 to request the OFC 102 to determine a processing content for the received packet. In addition, the VLAN setting management unit 107 updates the table so that the combination of the VLAN ID of the received packet and the reception port is added to the table. In addition, the VLAN setting management unit 107 requests the OpenFlow switch functional unit 105 to transmit the updated content to the OFC 102. When receiving such request, the OpenFlow switch functional unit 105 transmits the updated content of the table received from the VLAN setting management unit 107 to the OFC 102. For example, a message that can arbitrarily set by vendors in the OpenFlow protocol can be used for the transmission of the updated content. In the present exemplary embodiment, this message used for notification of the updated content of the table will be referred to as a VLAN STATUS message.

When receiving the VLAN STATUS message, the OFC 102 updates virtual network configuration information managed thereby on the basis of the received VLAN STATUS message, for example.

At this point, the OFC 102 may be caused to determine whether the combination of the VLAN ID and the reception port indicated in the received VLAN STATUS message is appropriate in view of a virtual network configuration and the like. As a result of the determination, if the OFC 102 determines that the combination of the VLAN ID and the reception port is not appropriate, the OFC 102 may instruct the OFS 100 to restore the table in the VLAN setting management unit 107 or set a flow entry for dropping relevant packets.

Next, an operation of the OFS 100 according to the present exemplary embodiment will be described in detail on the basis of a specific example.

[A Case in which a Port Receives a Packet Having a Known VLAN ID that does not Match the Port]

Figure 5:
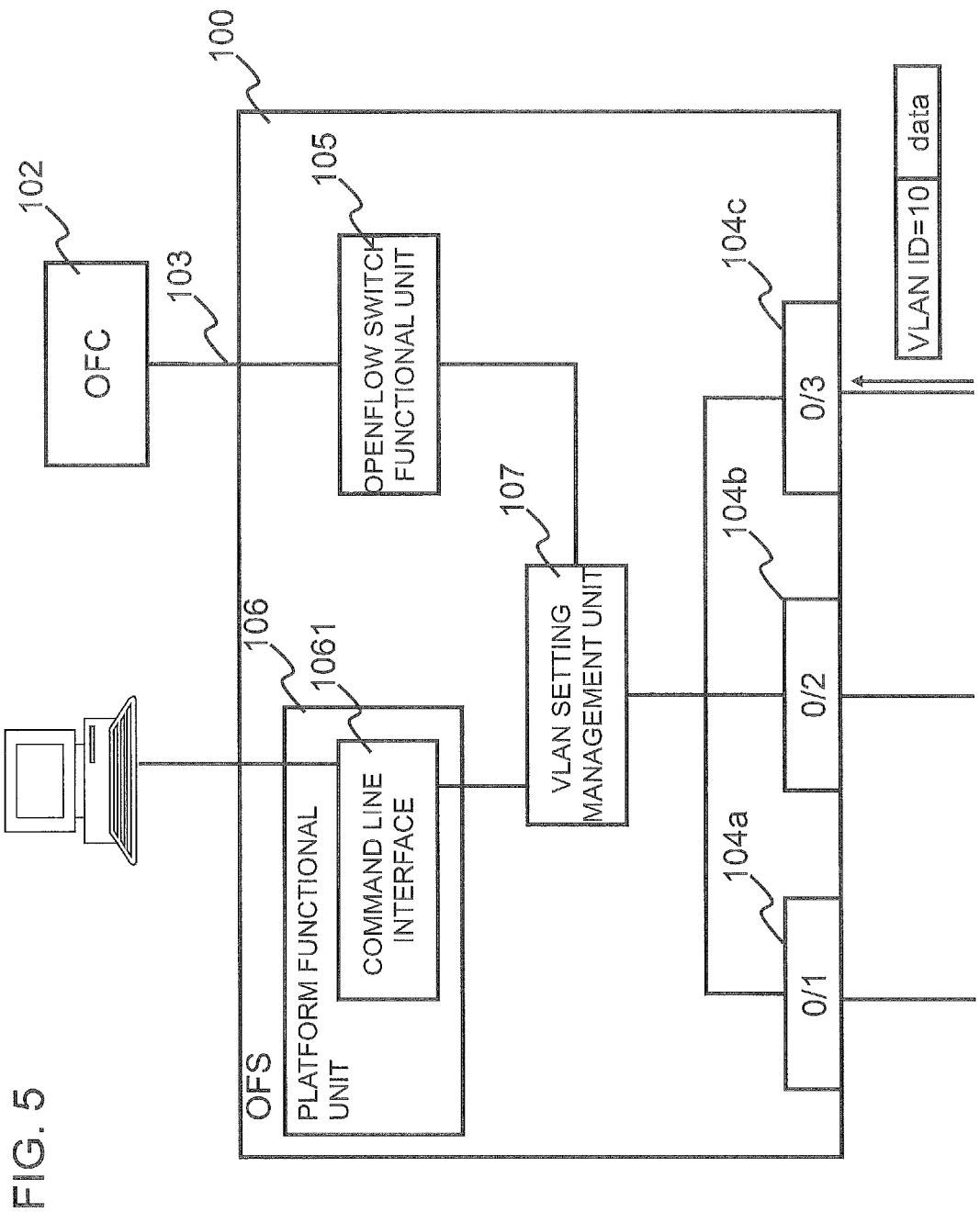
FIG. 5 illustrates an operation of the switch apparatus according to the first exemplary embodiment of the present disclosure (when a port receives a packet without VLAN ID).

FIG. 5 illustrates a case in which the port 104c receives a packet having VLAN ID=10. In this case, since VLAN ID=10 is added to the packet, the VLAN setting management unit 107 refers to the entry having VLAN ID=10 in the table illustrated in FIG. 3 and determines whether the combination of the port 104c and the VLAN ID is registered (step S002 in FIG. 4). Since only the port 104a (0/1) and the port 104b (0/2) are registered in the entry having VLAN ID=10 in FIG. 3, the VLAN setting management unit 107 determines that the combination is not registered.

Figure 6:
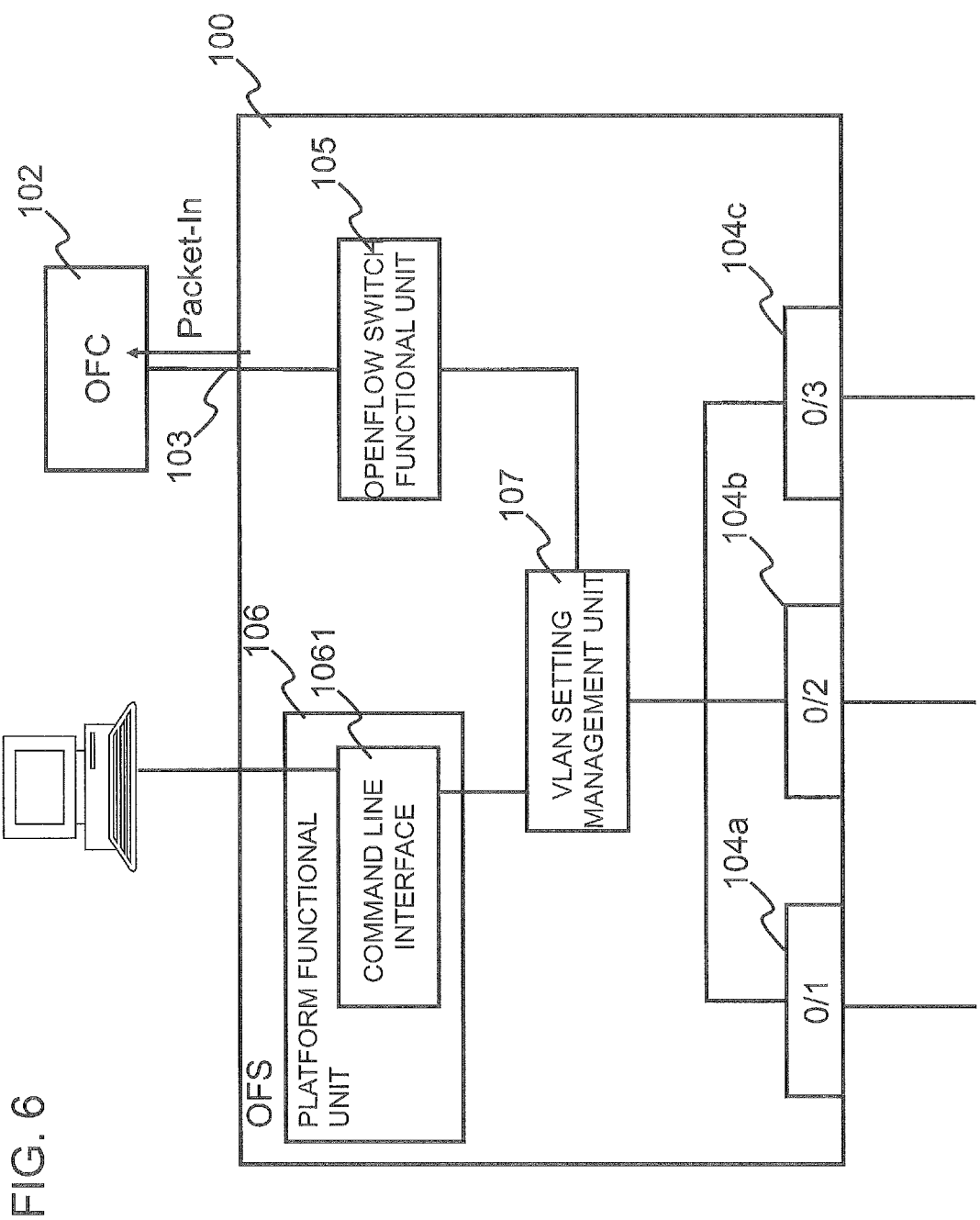
FIG. 6 illustrates an operation of the switch apparatus according to the first exemplary embodiment of the present disclosure (transmission of Packet-In).

In such case, as illustrated in FIG. 6, the OFS 100 transmits a message (Packet-In message) to the OFC 102 via the OpenFlow switch functional unit 105, to request the OFC 102 to determine a processing content(s) for the received packet.

Figure 7:
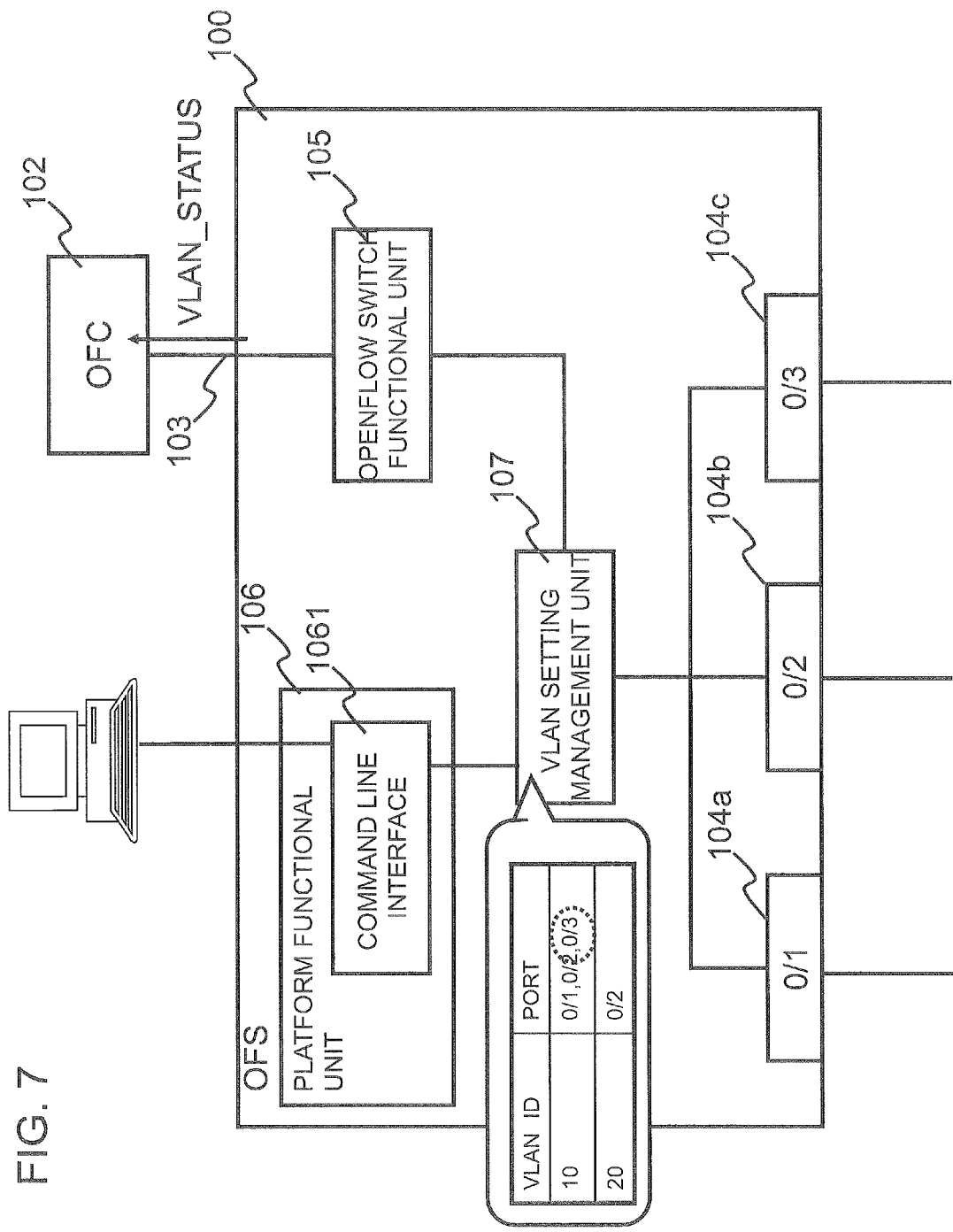
FIG. 7 illustrates an operation of the switch apparatus according to the first exemplary embodiment of the present disclosure (transmission of an updated content).

In addition, as illustrated in FIG. 7, the OFS 100 adds the reception port 104c (0/3) to the entry having VLAN ID=10 in the table in the VLAN setting management unit 107 and requests the OpenFlow switch functional unit 105 to transmit the updated content to the OFC 102. When receiving the request, the OpenFlow switch functional unit 105 uses a VLAN STATUS message and transmits the updated content of the table received from the VLAN setting management unit 107 to the OFC 102 (the addition of the port 104c (0/3) to the entry having VLAN ID=10).

[A Case in which a Packet Having an Unknown VLAN ID is Received]

Figure 8:
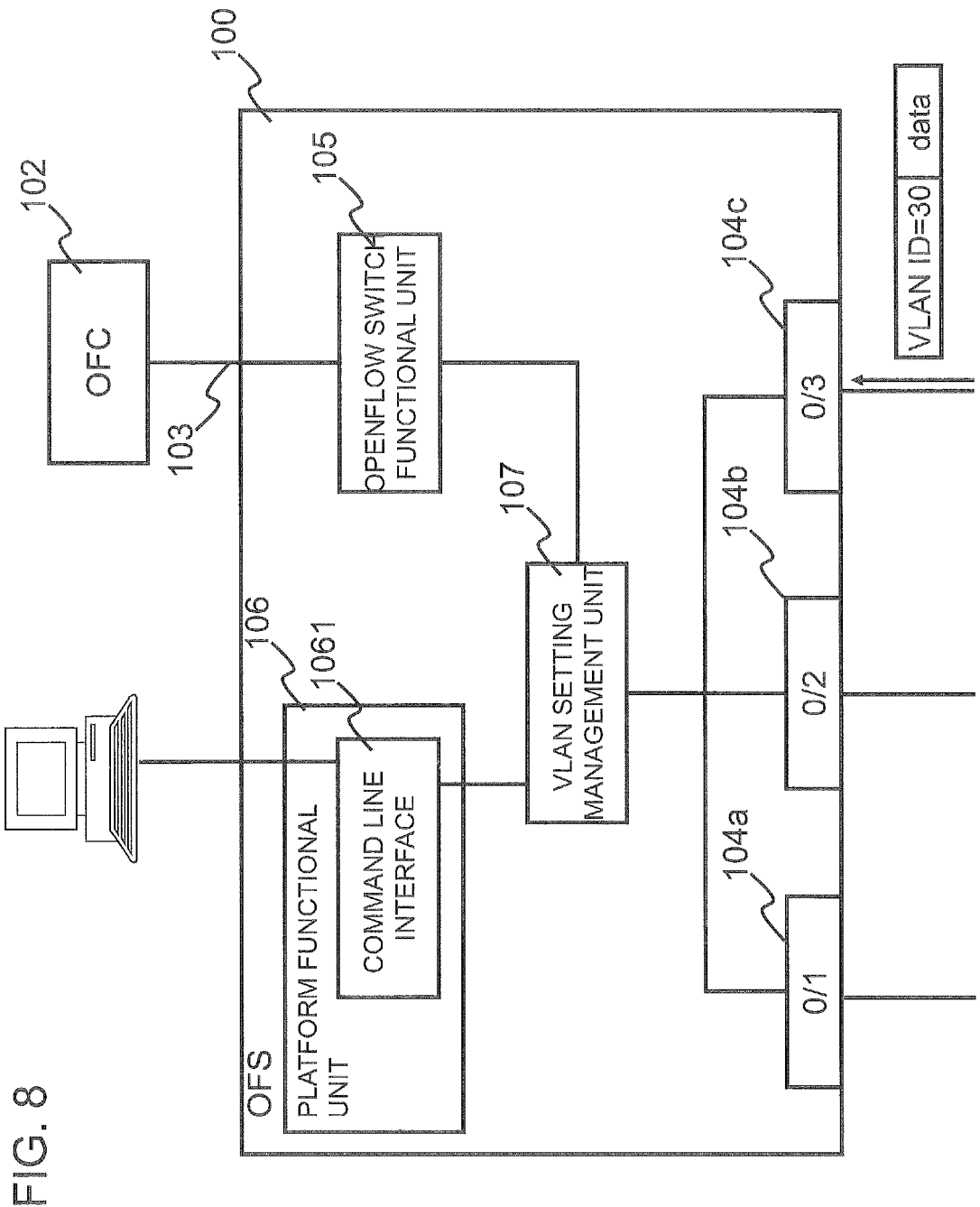
FIG. 8 illustrates an operation of the switch apparatus according to the first exemplary embodiment of the present disclosure (when a port receives a packet without VLAN ID).

FIG. 8 illustrates a case in which the port 104c receives a packet having VLAN ID=30. In this case, since VLAN ID=30 is added to the packet, the VLAN setting management unit 107 searches the table illustrated in FIG. 3 for an entry having VLAN ID=30. However, since the table illustrated in FIG. 3 does not include an entry having VLAN ID=30, the VLAN setting management unit 107 determines that the combination of the port 104c and the VLAN ID is not registered.

In this case, as illustrated in FIG. 6, the OFS 100 transmits a message (Packet-In message) to the OFC 102 via the OpenFlow switch functional unit 105 to request the OFC 102 to determine a processing content(s) for the received packet.

Figure 9:
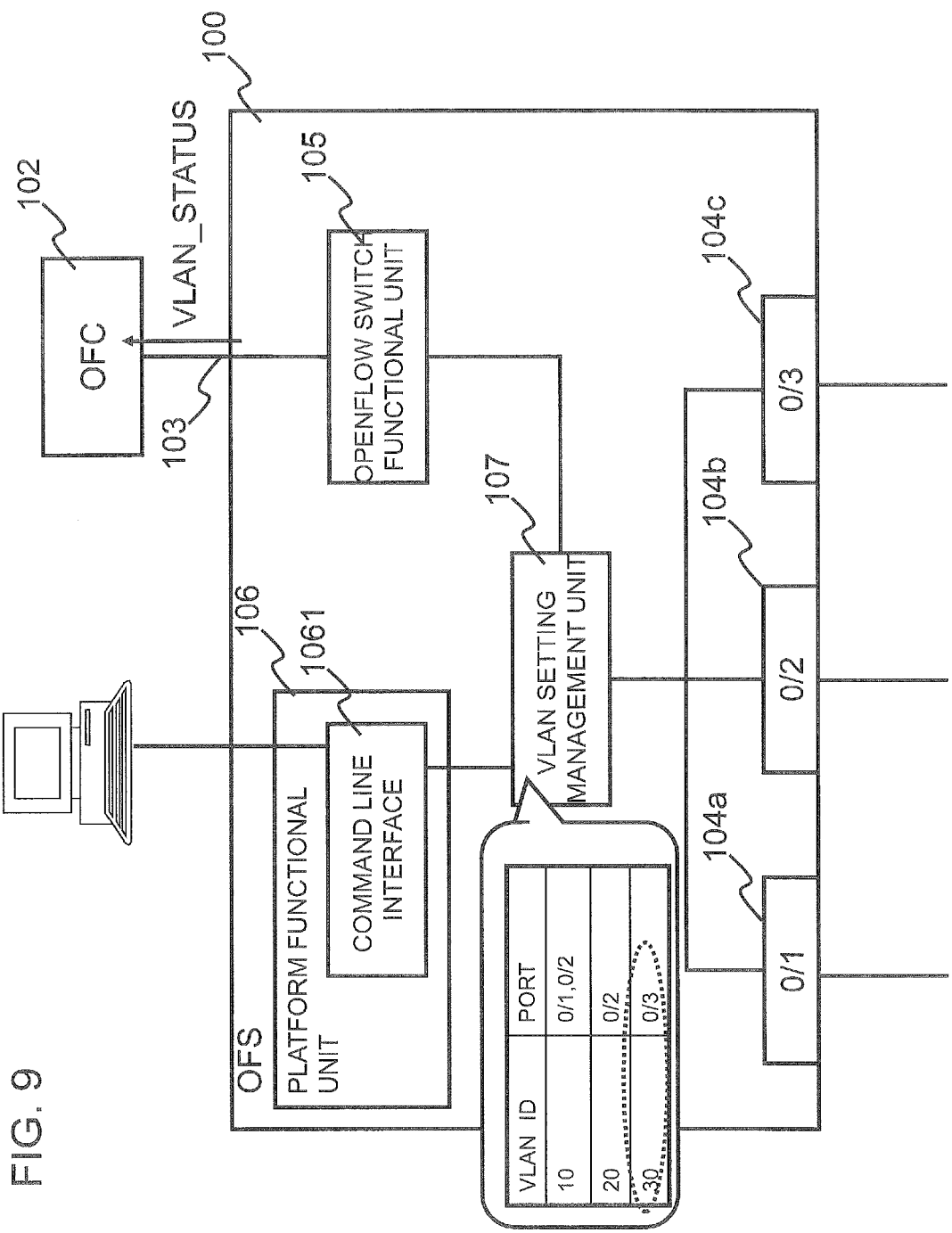
FIG. 9 illustrates an operation of the switch apparatus according to the first exemplary embodiment of the present disclosure (transmission of an updated content).

In addition, as illustrated in FIG. 9, the OFS 100 adds an entry in which VLAN ID=30 and the port 104c (0/3) are associated with each other in the table in the VLAN setting management unit 107 and requests the OpenFlow switch functional unit 105 to transmit the updated content to the OFC 102. When receiving the request, the OpenFlow switch functional unit 105 uses the VLAN STATUS message and transmits the updated content of the table received from the VLAN setting management unit 107 to the OFC 102 (the addition of the entry in which VLAN ID=30 and the port 104c (0/3) are associated with each other).

As described above, according to the present exemplary embodiment, even when a combination of a VLAN ID in a received packet and a reception port is not registered in the VLAN setting management unit 107, the OFS 100 automatically creates a VLAN ID and allocates the created VLAN ID to the reception port.

While an exemplary embodiment of the present invention has thus been described, the present invention is not limited thereto. Further variations, substitutions, and adjustments can be made to the present invention without departing from the basic technical concept of the present invention. For example, the number of ports and the number of items of VLAN information used in the above exemplary embodiment are merely examples. Therefore, these numbers are not limited.

In addition, while a combination of a VLAN ID and a port is transmitted to the OFC 102 in the above exemplary embodiment, such combination may be transmitted to another control apparatus that operates in coordination with the OFC 102.

In addition, in the above exemplary embodiment, a message (Packet-In message) requesting the OFC 102 to determine a processing content(s) for the received packet is transmitted before a combination of a VLAN ID and a port is transmitted. However, the combination of a VLAN ID and a port may be transmitted first.

The disclosure of each of the above PTLs and NPLs is incorporated herein by reference thereto. Modifications and adjustments of the exemplary embodiment and examples are possible within the scope of the overall disclosure (including the claims) of the present invention and based on the basic technical concept of the present invention. Various combinations and selections of various disclosed elements (including the elements in each claim, exemplary embodiment, example, drawing, etc.) are possible within the scope of the claims of the present invention. Namely, the present invention of course includes various variations and modifications that could be made by those skilled in the art according to the overall disclosure including the claims and the technical concept.

REFERENCE SIGNS LIST

10 switch apparatus
20 control apparatus
100 OpenFlow switch (OFS)
102 OpenFlow controller (OFC)
103 secure channel
104, 104*a* to 104*c* port
105 OpenFlow switch functional unit
106 platform functional unit
107 VLAN setting management unit
1061 command line interface (CLI)

What is claimed is:

1. A switch apparatus, comprising:
   a plurality of ports;
   a memory storing a first virtual network identifier, and a first port identifier associated with the first virtual network identifier; and
   a processor configured to execute program instructions to:
   receive a packet, including a second virtual network identifier, from an input port which comprises one of the ports;
   compare a first combination of the second virtual network identifier and the input port with a second combination of the first virtual network identifier and the associated first port identifier, respectively; and
   send the second virtual network identifier and a second port identifier, which represents the input port, to a control apparatus, separate from the switch apparatus, when the first combination does not match the second combination, wherein the control apparatus controls the switch apparatus.

2. The switch apparatus according to claim 1, wherein the processor is further configured to execute the program instructions to process the received packet.

3. The switch apparatus according to claim 1, wherein the processor is further configured to execute program instructions to:
   receive a flow entry to process the received packet from the control apparatus; and
   process, based on the flow entry, the received packet.

4. The switch apparatus according to claim 1, wherein the processor is further configured to execute program instructions to send a request to process the received packet to the control apparatus.

5. The switch apparatus according to claim 1, wherein the processor is further configured to execute program instructions to send a request to process the received packet to the control apparatus when the first combination does not match the second combination.

6. The switch apparatus according to claim 1, wherein the processor is further configured to execute program instructions to rewrite the first virtual network identifier and the first port identifier when the first combination does not match the second combination.

7. The switch apparatus according to claim 1, wherein the processor is further configured to execute program instructions to:
   receive an update instruction from the controller; and
   rewrite, based on the update instruction, the first virtual network identifier and the first port identifier.

8. The switch apparatus according to claim 1,
   wherein the first combination comprises the second virtual network identifier from the input port, and
   with the second combination comprises the first virtual network identifier from the first port identifier.

9. The switch apparatus according to claim 1, wherein the processor sends the second virtual network identifier and the second port identifier to the control apparatus when the first combination of the second virtual network identifier from the input port does not match the second combination of the first virtual network identifier from the first port identifier, the second port identifier being different than the first port identifier.

10. A communication system, comprising:
    a switch apparatus; and
    a control apparatus configured to control the switch apparatus,
    wherein the control apparatus comprises:
    a plurality of ports;
    a memory storing a first virtual network identifier, and a first port identifier associated with the first virtual network identifier; and
    a processor configured to execute program instructions to:
    receive a packet, including a second virtual network identifier, from an input port which comprises one of the ports;
    compare a first combination of the second virtual network identifier and the input port with a second combination of the first virtual network identifier and the associated first port identifier, respectively; and
    send the second virtual network identifier and a second port identifier, which represents the input port, to the control apparatus, separate from the switch apparatus, when the first combination does not match the second combination.

11. The system according to claim 10, wherein the processor is further configured to execute the program instructions to process the received packet.

12. The communication system according to claim 10, wherein the processor is further configured to execute program instructions to:
    receive a flow entry to process the received packet from the control apparatus; and
    process, based on the flow entry, the received packet.

13. The communication system according to claim 10, wherein the processor is further configured to execute program instructions to send a request to process the received packet to the control apparatus.

14. The communication system according to claim 10, wherein the processor is further configured to execute program instructions to send a request to process the received packet to the control apparatus when the first combination second virtual network identifier and the input port does not match the second combination first virtual network identifier and the first port identifier, respectively.

15. The communication system according to claim 10, wherein the processor is further configured to execute program instructions to rewrite the first virtual network identifier and the first port identifier when the first combination second virtual network identifier and the input port does not match the second combination first virtual network identifier and the first port identifier, respectively.

16. The communication system according to claim 10, wherein the processor is further configured to execute program instructions to:
   receive an update instruction from the controller; and
   rewrite, based on the update instruction, the first virtual network identifier and the first port identifier.

17. A communication method, comprising:
   receiving a packet, including a second virtual network identifier, from an input port which comprises one of the ports;
   comparing a first combination of the second virtual network identifier and the input port with a second combination of a first virtual network identifier and a first port identifier associated with the first virtual network identifier, respectively; and
   sending the second virtual network identifier and a second port identifier, which represents the input port, to a control apparatus, separate from a switch apparatus, when the first combination does not match the second combination, wherein the control apparatus controls the switch apparatus.

18. The communication method according to claim 17, further comprising of processing the received packet.

19. The communication method according to claim 17, further comprising:
   receiving a flow entry to process the received packet from the control apparatus; and
   processing, based on the flow entry, the received packet.

20. The communication method according to claim 17, further comprising sending a request to process the received packet to the control apparatus.

21. The communication method according to claim 17, further comprising sending a request to process the received packet to the control apparatus when the first combination does not match the second combination.

22. The communication method according to claim 17, further comprising rewriting the first virtual network identifier and the first port identifier when the first combination does not match the second combination.

23. The communication method according to claim 17, further comprising:
   receiving an update instruction from the controller; and
   rewriting, based on the update instruction, the first virtual network identifier and the first port identifier.

24. A computer program product for encoding, the computer program product comprising a non-transitory computer readable storage medium having program instructions embodied therewith, the program instructions readable and executable by a processor to cause the processor to execute the communication method according to claim 17.

* * * * *